Sept. 17, 1946. H. W. McPHERSON 2,407,761
VALVE
Filed Jan. 14, 1944 5 Sheets-Sheet 1
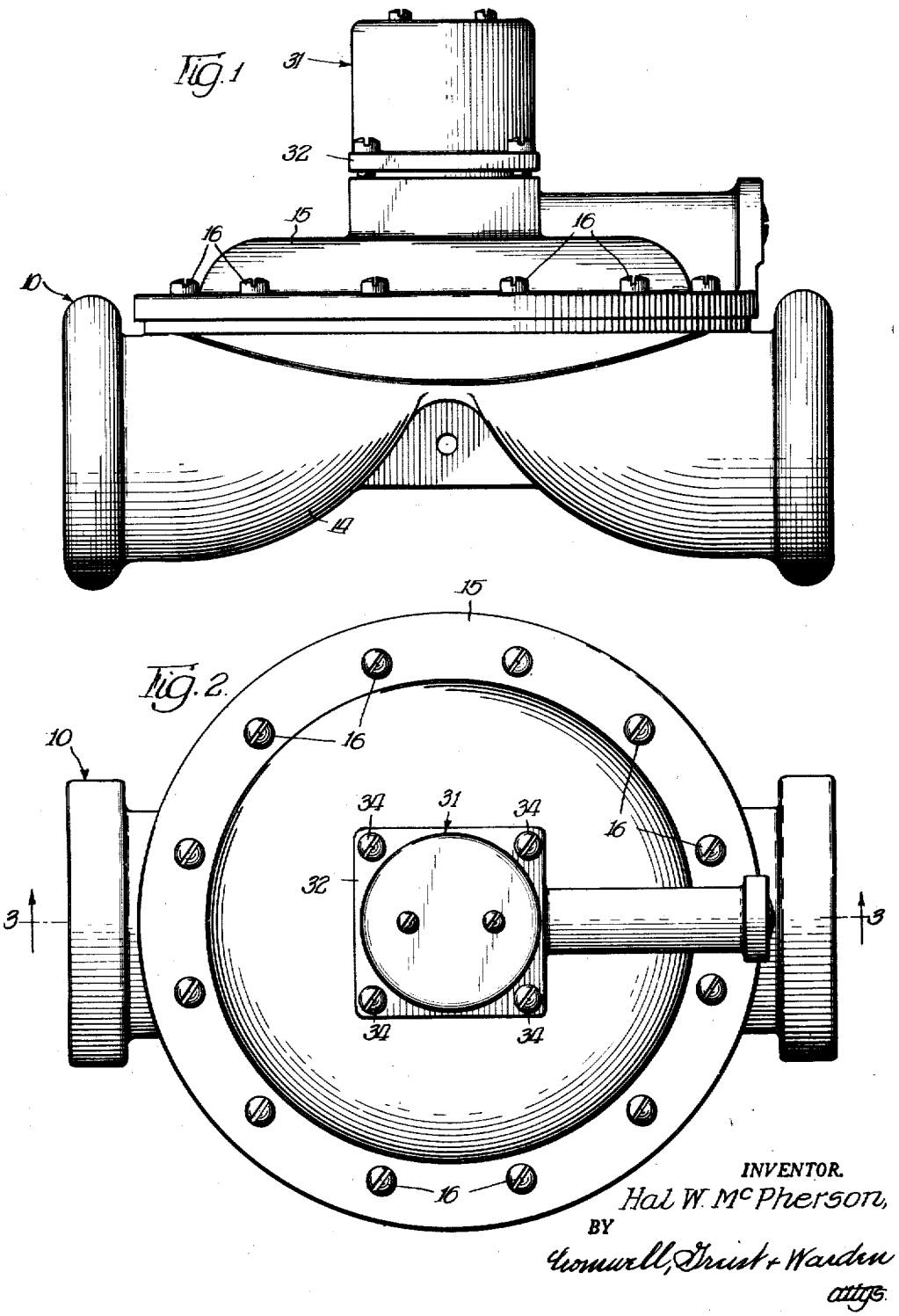

INVENTOR.
Hal W. McPherson,

Sept. 17, 1946.  H. W. McPHERSON  2,407,761
VALVE
Filed Jan. 14, 1944  5 Sheets-Sheet 3
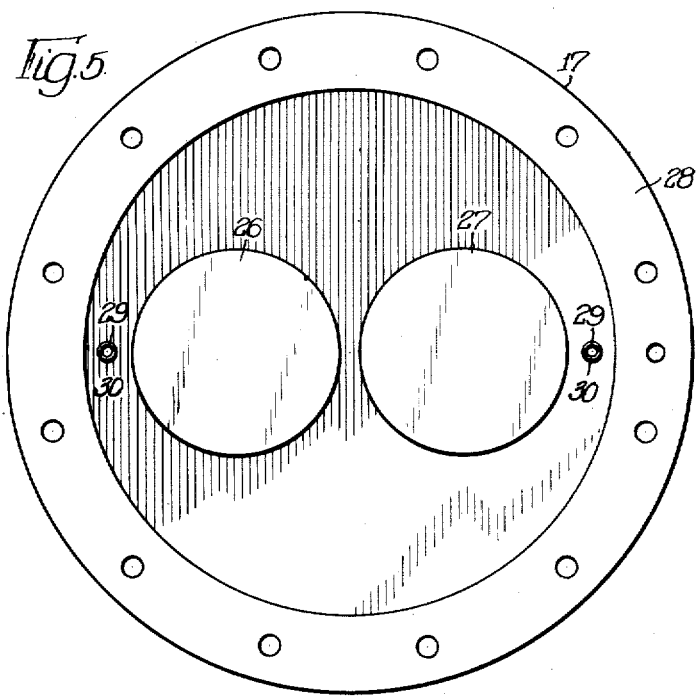
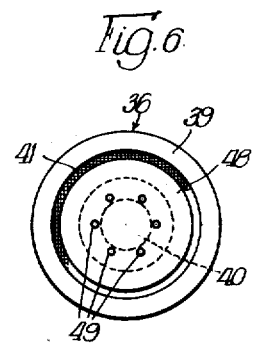
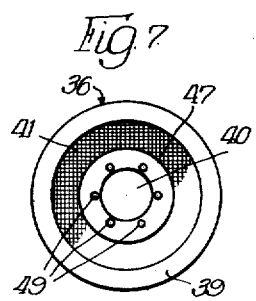
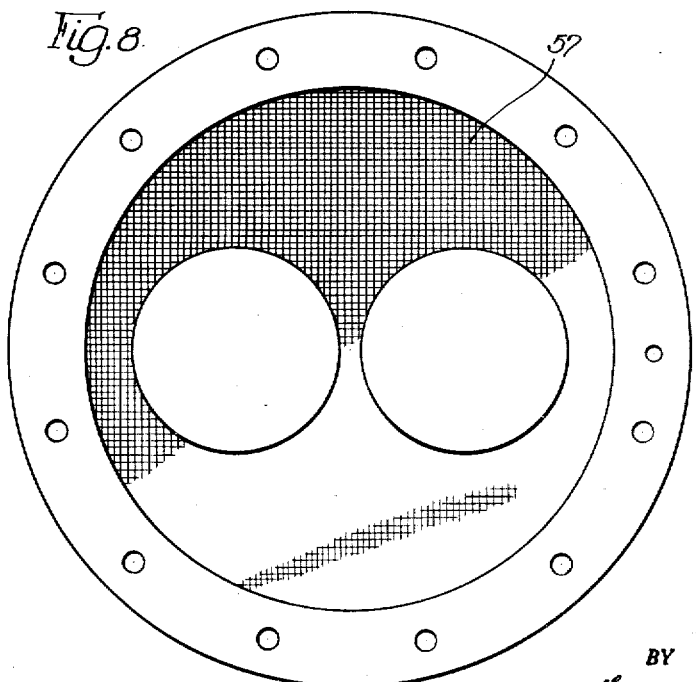
INVENTOR.
Hal W. McPherson,
BY
Cromwell, Greist & Warden
Attys Sept. 17, 1946.   H. W. McPHERSON   2,407,761
VALVE
Filed Jan. 14, 1944   5 Sheets-Sheet 4
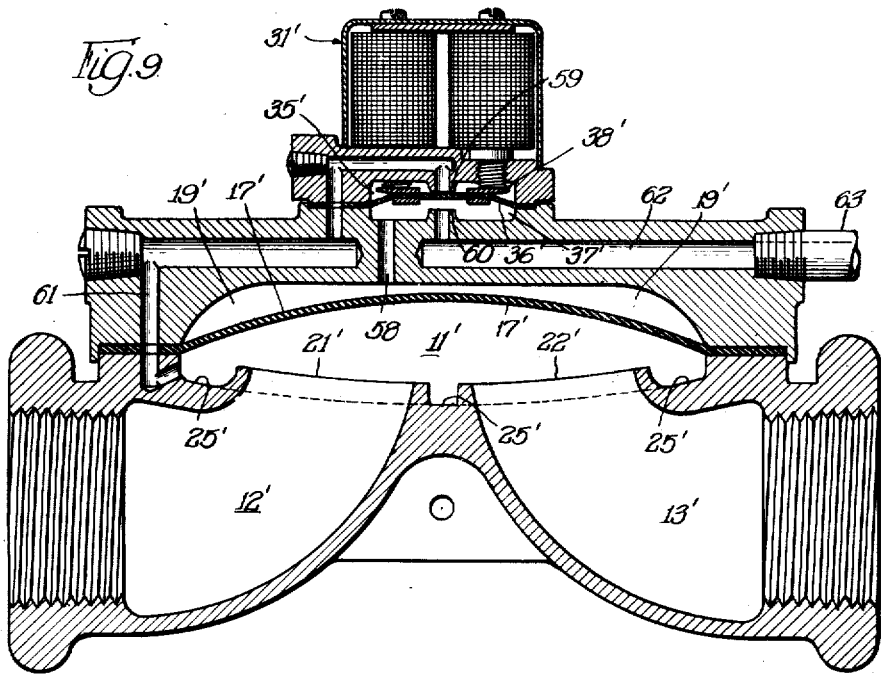
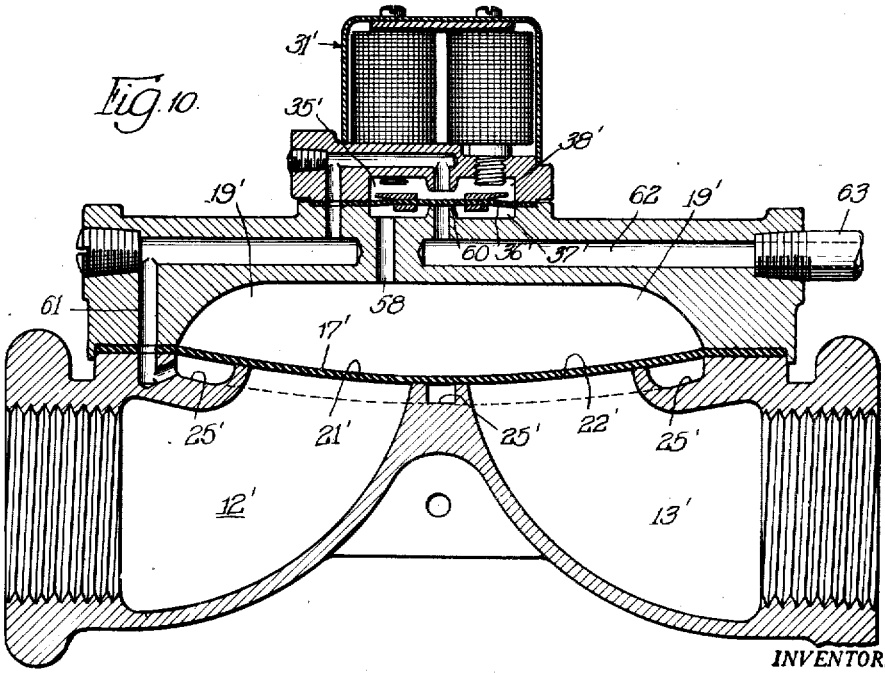
INVENTOR.
Hal W. McPherson,
BY
Cromwell, Greist & Warden
ATTYS Sept. 17, 1946.  H. W. McPHERSON  2,407,761
VALVE
Filed Jan. 14, 1944  5 Sheets-Sheet 5

INVENTOR.
Hal W. McPherson,
BY
Cromwell, Greist & Warden
attys.

Patented Sept. 17, 1946

2,407,761

UNITED STATES PATENT OFFICE 2,407,761

VALVE

Hal W. McPherson, Chicago, Ill., assignor to Allied Control Co., Inc., New York, N. Y., a corporation of New York Application January 14, 1944, Serial No. 518,233

7 Claims. (Cl. 137—139)

This invention has to do with valves, and is particularly concerned with shut-off valves of the type in which the pressure of the fluid entering the valve is utilized to either open or close the valve under the control of an associated operating device.

One of the objects of the invention is to provide an improved valve of the type described in which the passages through the valve are so shaped as to permit the fluid to flow through such passages with but a very small drop in pressure.

Another object is to provide an improved valve of the type described which is extremely simple, light, compact and inexpensive in construction; shuts off quickly and completely; can be operated from a remote point; will not stick; requires no grinding; holds the pressure of the entering fluid or any back pressure with equal facility when closed; is leak proof and absolutely dependable; and can be made in either a semi-balanced form for handling a flow in but one direction or in a fully balanced form for handling a flow in either direction.

Still another object is to provide, in connection with a valve of the type described, an improved solenoid actuated operator for controlling the valve, which operator uses but a very small amount of current.

While a valve constructed in accordance with the present invention can be used advantageously in many different applications, it is especially well suited for use in airplane fuel line applications and other similarly exacting situations where lightness, compactness, simplicity, ease of control, and dependability are factors of prime importance.

The foregoing statements are indicative in a general way of the nature of the invention but other more specific objects and advantages will be apparent to those skilled in the art upon a full understanding of the construction and operation of the new valve.

Two different embodiments of the invention— one a semi-balanced form for flow in but one direction and the other a fully balanced form for flow in either direction—are presented herein for the purpose of exemplification, but it will of course be appreciated that the invention is susceptible of incorporation in other modified forms coming equally within the scope of the appended claims.

In the accompanying drawings:

Fig. 1 is a side view of a semi-balanced valve constructed in accordance with the invention;

Fig. 2 is a plan view of the valve;

Fig. 5 is a plan view of the large diaphragm which is located in the main chamber of the valve;

Fig. 6 is a plan view of the small diaphragm which is located in the operator;

Fig. 7 is a bottom plan view of the diaphragm in the operator;

Fig. 8 is a plan view of a modified form of the large diaphragm in the main chamber of the valve;

Fig. 9 is a vertical section through the center of a fully balanced valve constructed in accordance with the invention, showing the valve open;

Fig. 10 is a similar section, showing the valve closed;

Figure 3:
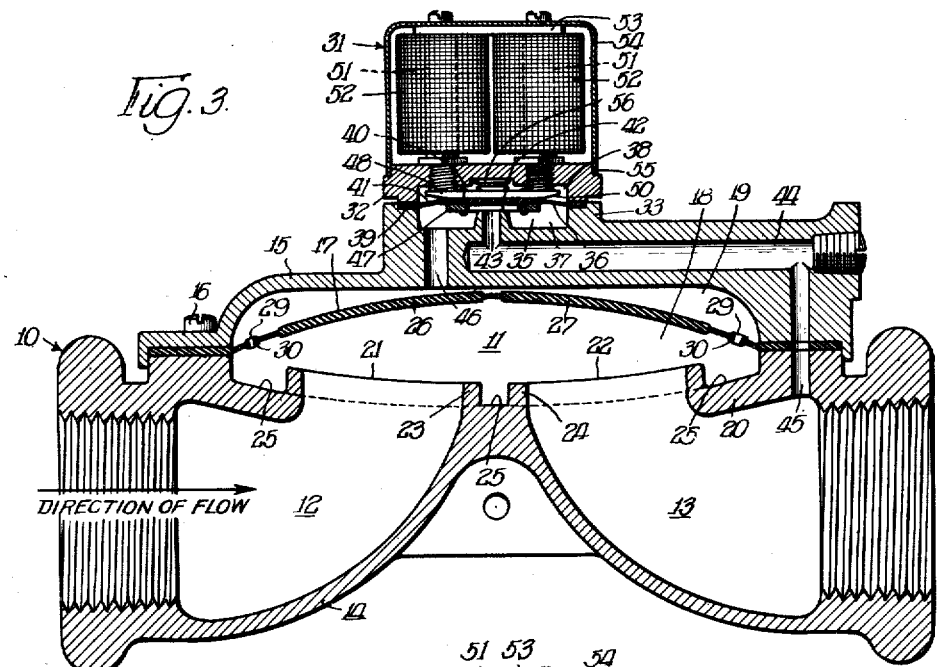
Fig. 3 is a vertical section through the center of the valve, taken on the line 3—3 of Fig. 2, showing the valve open.

The valve shown in Figs. 1 to 7 inclusive will first be described. This valve is semi-balanced, in the sense that while the valve will handle a flow of fluid in but one direction, namely, from the left, the pressure of the fluid being handled will act to hold the valve closed after it has once been closed regardless of the direction in which such pressure is exerted on the closure means.

As will be observed in these views, the valve includes a body 10 which contains a chamber 11, an inlet port 12, and an outlet port 13. The body 10 is composed of two complementary parts 14 and 15 which are fastened together by a plurality of machine screws 16. The chamber 11 in the body is a shallow circular cavity which is divided by a flexible diaphragm 17 into a front portion 18 and a rear portion 19. The inlet and outlet ports 12 and 13 enter the body 10 from opposite directions and curve rearwardly toward the center of the front portion 18 of the chamber in a plane which is perpendicular to the plane of the chamber, forming with the front portion of the chamber a sinuous free flow passage through the body from one side to the other when the diaphragm 17 is in its rearwardly flexed position.

The front wall 20 of the chamber 11 is dished forwardly to conform generally to the shape of the diaphragm 17 when the latter is in its forwardly flexed position, and is provided with two circular seats 21 and 22 which are located at opposite sides of the center of the front portion of the chamber in laterally spaced relation to each other. The seats 21 and 22 form the ends of the inlet and outlet ports 12 and 13, and are located on bead-like rims 23 and 24 which project rearwardly from the front wall 20, leaving channels 25 in the front portion of the chamber about such rims. The seats 21 and 22 have the same dished curvature as the diaphragm 17 when the latter is in its forwardly flexed position, and are adapted to be engaged and sealed by correspondingly spaced circular portions 26 and 27 of the diaphragm 17.

The diaphragm 17 is preferably made of thin, readily flexible imperforate material. The circular portions 26 and 27, which are adapted to engage with the seats 21 and 22, are relatively thick portions which are preferably formed by bonding one or more layers of synthetic rubber or other suitable sealing material to the material of the diaphragm proper. The outer marginal portion 28, which is clamped between the complementary edges of the body parts 14 and 15, is likewise a relatively thick portion which is preferably formed by the addition of one or more layers of synthetic rubber or other suitable sealing material.

The diaphragm 17 is provided, opposite the channels 25 in the front portion 18 of the chamber, with a plurality of minute vents 29, formed by the insertion of eyelets 30. These vents serve as bleeders for flooding the rear portion 19 of the chamber behind the diaphragm 17.

A solenoid operator 31 is connected with the valve for operating the same. This operator includes a base plate 32 which is secured to the rear wall 33 of the chamber 11 by a plurality of machine screws 34. The operator 31 is provided with a relatively small shallow circular chamber 35, which chamber is formed partly in the base plate 32 and partly in the rear wall 33. The chamber 35 contains a thin flexible diaphragm 36 which is clamped marginally between the base plate and the rear wall. The diaphragm 36 divides the chamber 35 into a front portion 37 and a rear portion 38. The diaphragm is provided, at its outer edge, with a thickened portion 39 of synthetic rubber or other suitable sealing material, and is provided, at its center, with a thickened portion 40 of similar sealing material. The diaphragm 36 has an intervening annular portion 41, in the form of a fine porous screen, through which the fluid can flow to equalize the pressure in the chamber 35 on both sides of the diaphragm. The portion 41 also acts as a protecting filter for the cooperating parts of the solenoid. The thickened center portion 40 of the diaphragm is adapted to engage with a small circular seat 42 in front of the same, to close off such seat. The seat 42 opens into a duct 43 which communicates with a laterally extending duct 44. The duct 44 in turn communicates with a duct 45 which discharges into the outlet port 13 of the valve. Another duct 46 leads from the rear portion 19 of the chamber 11 of the valve into the front portion 37 of the chamber 35 in the operator.

The diaphragm 36 in the operator 31 is provided on its front face with a reinforcing washer 47 and on its rear face with an armature disk 48. The washer 47 and the disk 48 are secured together through the imperforate center portion 40 of the diaphragm by a plurality of small rivets 49. The outer edge of the disk 48 is beveled at 50 to permit the diaphragm to cup to a certain extent about the same when the diaphragm is flexed forwardly. The opening in the center of the washer 47 is larger than the seat 42 to clear the latter.

The base plate 32 of the operator 31 supports two pole pieces 51 which are threaded through the base plate into the rear portion 38 of the chamber 35 at points equidistant from the center of the armature disk 48, for electromagnetic coaction with the latter. The pole pieces are encircled by magnet coils 52 and are bridged by a tie bar 53 to form the electromagnet of a solenoid. This electromagnet is housed within a cap 54 which fits over a rim 55 on the base plate.

Figure 4:
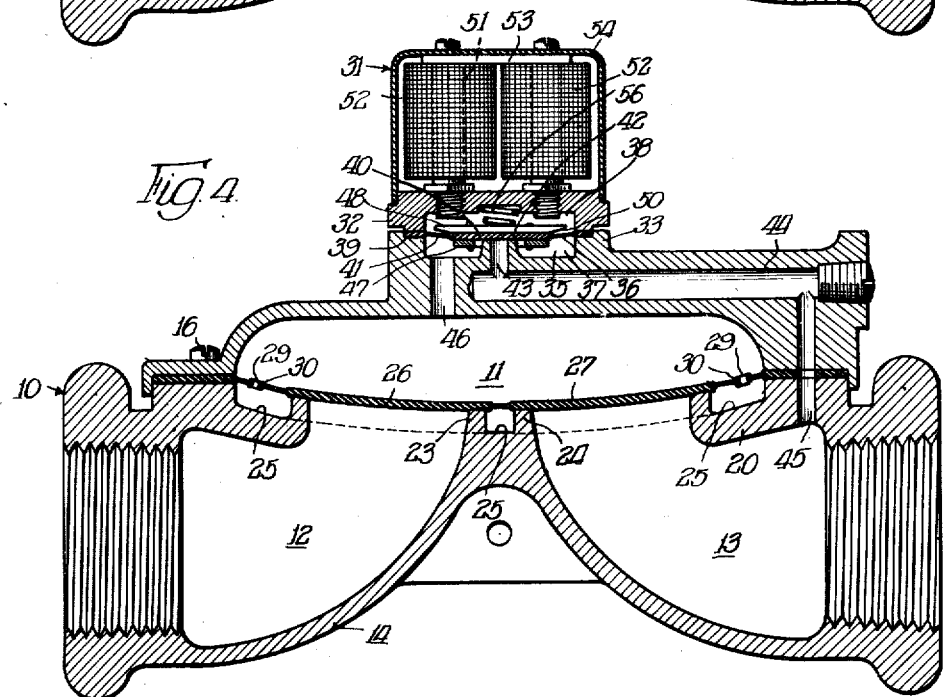
Fig. 4 is a similar section, showing the valve closed.

When the solenoid is energized the armature disk 48 will be drawn up against the ends of the pole pieces 51, against the yielding resistance of a coil spring 56, and the seat 42 will be opened. When the solenoid is de-energized the spring 56 will force the armature disk away from the pole pieces and the seat will be closed. The opening of the seat 42 will result in the diaphragm 17 being flexed rearwardly to open up the sinuous passage through the valve, as shown in Fig. 3, while the closing of the seat 42 will result in the diaphragm 17 being flexed forwardly to close off the passage through the valve, as shown in Fig. 4.

This action is brought about by a flooding of the rear portion 19 of the chamber 11, which flooding results from the fluid being pocketed in the rear portion 19 by the closing off of the escape duct 46 at the seat 42. The cross sectional area of the duct 46, as well as of the seat 42 and the ducts 43, 44 and 45, is larger than the aggregate cross sectional areas of the vents 29. As long as the seat 42 is open, the fluid entering the rear portion 19 of the chamber through the vents 29 will escape from the rear portion through the duct 46. When the duct 46 is shut off, however, by the closing of the seat 42, the fluid entering the rear portion 19 through the vents 29 will be pocketed, flooding the rear portion and forcing the diaphragm 17 forwardly into engagement with the seats 21 and 22, and particularly with the seat 22.

The rate of closing of the valve can be controlled by either changing the size or the number of the vents 29. For example, two vents of the size shown might close the valve in say about a third of a second, one might close it in about a second, and three might close it in about one-tenth of a second.

When the diaphragm 17 has flexed forwardly into a position wherein the seat 22 is engaged by the portion 27 of the diaphragm, the fluid will continue to flow momentarily between the seat 21 and the portion 26 of the diaphragm into the channels 25 and through the vents 29, until the pressure behind the diaphragm urging the portion 27 against the seat 22 has reached the pressure of the fluid in the inlet port 12, whereupon the portion 27 of the diaphragm will be securely sealed against the seat 22 and maintained in such sealed condition by the pressure of the fluid on the inlet side.

Should the valve when closed be holding fluid under pressure on the outlet side, the valve can be even disconnected at the inlet side without allowing the fluid to flow back through the valve. Under such conditions, the back pressure of the fluid will act against the rear face of the portion 26 of the diaphragm to maintain the portion 26 in securely sealed engagement with the seat 21, the flow necessary to create such pressure passing momentarily between the portion 27 of the diaphragm and the seat 22.

As previously pointed out, the operator 31 will open the valve and keep it open only as long as the solenoid in the operator is energized, and will automatically close as soon as the solenoid is de-energized. These operations can be reversed, if desired, by substituting an operator in which the seat 42 is positioned behind the diaphragm 36 instead of in front of the same, in which case the valve will close when the solenoid is energized and remain closed only as long as the solenoid continues to be energized.

The valve shown in Figs. 1 to 7 inclusive, is what is known as a normally closed valve, that is to say it is open only when the solenoid in the operator 31 is energized. It could of course be constructed just as easily as a normally open valve, merely by substituting a different operator.

The diaphragm 17, instead of being provided with the vents 29, might be formed, as shown in Fig. 8, of a semi-porous fabric 57 having a total porosity over the exposed areas equivalent to the porosity obtained with the vents.

The valve shown in Figs. 9 and 10 is similar in many respects to the valve shown in Figs. 1 to 7 inclusive, but is fully balanced, in the sense that it will handle a flow passing through the valve in either direction. In this valve the diaphragm 17' contains no vents of any kind, and the fluid used in flooding the rear portion 19' of the chamber 11' to move the diaphragm forwardly into sealed engagement with the seats 21' and 22' both enters and leaves the rear portion 19' through a duct 58.

An operator 31' is employed having a marginally perforated diaphragm 36' which is movable rearwardly into sealed engagement with an annular seat 59 and is movable forwardly into sealed engagement with an annular seat 60. The seat 59 forms the end of a duct 61 which leads by a rather circuitous path from one of the connected channels 25' surrounding the seats 21' and 22' in the front portion 18' of the chamber 11' in the valve. The seat 59 opens into the rear portion 38' of the chamber 35' in the operator and communicates with the duct 58 through the perforated portion of the diaphragm 36' when the latter is in its forwardly flexed position in sealed engagement with the seat 60. The seat 60 forms the entrance to a duct 62 which during the opening movement only of the valve discharges a small quantity of the fluid either into the atmosphere or into a conduit 63 leading to a container or other low pressure part of the system. The duct 58 communicates with the discharge duct 62 through the front portion 37' of the chamber 35' when the diaphragm 36' is in its rearwardly flexed position in sealed engagement with the seat 59.

When the solenoid in the operator 31' is in its energized condition, as shown in Fig. 9, the seat 59 will be closed and the seat 60 will be open. As a result, the duct 61 used in flooding the rear portion 19' of the chamber 11' during the valve closing operation will be closed and the duct 62 used in evacuating the rear portion 19' during the valve opening operation will be open to the atmosphere, maintaining the diaphragm 17' in its rearwardly flexed or open position. When the solenoid in the operator is de-energized, as shown in Fig. 10, the seat 59 will be opened and the seat 60 will be closed. This will open the duct 61 and allow the fluid being handled to pass through such duct into the rear portion 19' of the chamber. The fluid entering the rear portion will be pocketed in the same and prevented from leaving by the closed condition of the duct 62, and will result in the rear portion 19' of the chamber becoming flooded, causing the diaphragm 17' to move into sealed engagement with first one of the ports 21' and 22' and then the other, the order depending of course upon the direction of flow. After the valve has been closed it will shut off the flow through the valve and will hold the fluid against pressure in either direction. When the solenoid is again energized, the fluid pocketed behind the diaphragm 17' will escape through the duct 62 and the valve will resume its opened position.

If it is desired to have the valve move into its closed position instead of into its open position when the solenoid in the operator 31' is energized, this can be done very simply by substituting an operator in which the positions of the seats 59 and 60 with respect to the diaphragm 36' are reversed.

Figure 11:
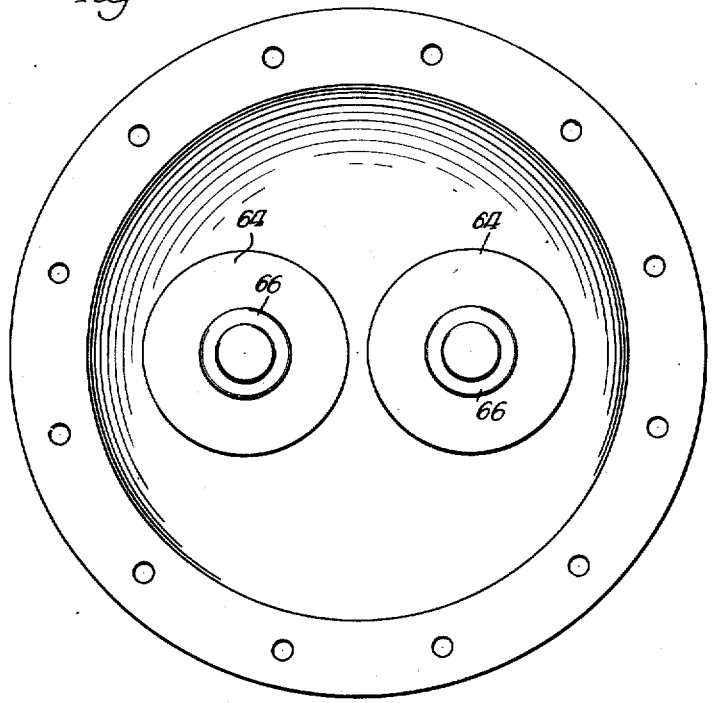
Fig. 11 is a plan view of a modified form of the diaphragm in the chamber of the valve shown in Figs. 9 and 10.
Figure 12:
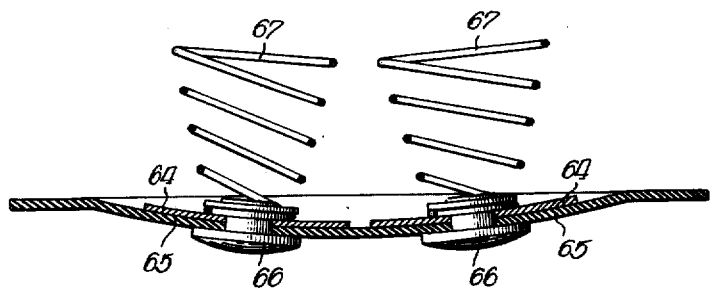
Fig. 12 is a vertical section through the center of the diaphragm shown in Fig. 11.

If the valve is to be subject to extremely high pressures, the diaphragm in the main chamber of the valve may be provided, at the locations of the ports to be closed, with metallic reinforcing disks 64, as shown in Figs. 11 and 12. The disks 64 are attached to the underlying sealing portions 65 of the diaphragm by rivets 66. If desired, light coil springs 67 may be positioned under compression between the rear wall of the chamber and the disks 64 for urging the diaphragm forwardly into its sealed position.

In constructing a valve in accordance with the invention the metal parts of the valve are preferably made of aluminum, or of some alloy of aluminum, whereby to reduce the weight of the valve to a minimum and at the same time avoid the necessity of insulating the electrically actuated parts of the operator.

I claim:

1. In a shut-off valve for handling a fluid under pressure, a chamber, a movable diaphragm dividing the chamber into a front portion and a rear portion, two ports opening into the front portion of the chamber, one of said ports constituting an inlet for the fluid and the other constituting an outlet for the fluid, said diaphragm being movable forwardly to seat a portion of the area thereof against said ports and close off the outlet port and being movable rearwardly to place the outlet port in communication with the inlet port by way of the front portion of the chamber, means disposed downstream from said inlet port, between the inlet and outlet ports and outside of said portion of the diaphragm area for conducting some of the fluid from the inlet port into the rear portion of the chamber, whereby to pocket such fluid under pressure in the rear portion of the chamber behind the diaphragm to flood the rear portion and cause the diaphragm to move forwardly into sealed engagement with the outlet port, and means for controlling the operation of said last mentioned means.

2. In a shut-off valve for handling a fluid under pressure, a chamber, two ports opening into the chamber, one port constituting an inlet for the fluid under pressure and the other an outlet for such fluid, a flexible diaphragm in the chamber spanning both ports and dividing the chamber into front and rear portions, the diaphragm being movable into the front portion of the chamber to seat a portion of the area thereof across and close off the ports and being movable into the rear portion to permit communication of the outlet port with the inlet port through the front portion, means located downstream from said inlet port, between the inlet and outlet ports and outside of said portion of the diaphragm area for conducting some of the fluid from the inlet port into the rear portion of the chamber whereby to pocket such fluid under pressure in the rear portion of the chamber behind the diaphragm to flood the rear portion and cause the diaphragm to move forwardly into the front portion into sealed engagement with the outlet port, and means for operating said last mentioned means.

3. In a shut-off valve for handling a fluid under pressure, a chamber, a movable diaphragm dividing the chamber into a front portion and a rear portion, two ports opening into the front portion of the chamber, one of said ports constituting an inlet for the fluid and the other constituting an outlet for the fluid, said diaphragm being movable forwardly to seat a portion of the area thereof against said ports and close off the outlet port and being movable rearwardly to place the outlet port in communication with the inlet port by way of the front portion of the chamber, means located downstream from said inlet port, between the inlet and outlet ports and outside of said portion of the diaphragm area for conducting some of the fluid under pressure from the inlet port into the rear portion of the chamber behind the diaphragm, means for conducting such fluid from the rear portion to the outlet port, and means for rendering said last mentioned means inoperative, whereby the fluid entering the rear portion of the chamber through said first mentioned means will be pocketed in the rear portion and will flood the same to cause the diaphragm to move forwardly into sealed engagement with the outlet port.

4. In a shut-off valve for handling a fluid under pressure, means defining a chamber having a front wall, a rear wall and a movable diaphragm dividing the chamber into a front portion and a rear portion, two ports opening into the front portion of the chamber through the front wall of the latter, one of said ports constituting an inlet for the fluid and the other constituting an outlet for the fluid, said diaphragm being movable forwardly to seat a predetermined area thereof against said ports and close off the outlet port and being movable rearwardly to place the outlet port in communication with the inlet port by way of the front portion of the chamber, said first named means having means disposed downstream from the inlet port, between the inlet and outlet ports and outside of said predetermined area for pocketing some of the fluid under pressure in the rear portion of the chamber behind the diaphragm whereby to flood the rear portion and cause the diaphragm to move forwardly into sealed engagement with the outlet port, and means for controlling the operation of said last mentioned means, said outlet port being provided with a seat in the form of a marginal rim which projects toward the diaphragm from the front wall of the front portion of the chamber, for engagement with said predetermined area of the diaphragm, whereby when the diaphragm is in its forward position it will engage only with the rim and leave a space for the fluid about the outlet port between the diaphragm and said front wall.

5. In a shut-off valve for handling a fluid under pressure, a chamber, a movable diaphragm dividing the chamber into a front portion and a rear portion, two ports opening into the front portion of the chamber, one of said ports constituting an inlet for the fluid and the other constituting an outlet for the fluid, said diaphragm being movable forwardly to seat a predetermined portion of the area thereof against said ports and close off the outlet port and being movable rearwardly to place the outlet port in communication with the inlet port by way of the front portion of the chamber, means disposed downstream from the inlet port, between the inlet and outlet ports and outside of said predetermined diaphragm area for conducting some of the fluid under pressure from the inlet port into the rear portion of the chamber behind the diaphragm, means for conducting such fluid from the rear portion to the outlet port, said last mentioned means permitting of a greater rate of flow than the first mentioned means, whereby to prevent any substantial accumulation of the fluid in the rear portion, and means for rendering said last mentioned means inoperative, whereby the fluid entering the rear portion of the chamber through said first mentioned means will be pocketed in the rear portion and will flood the same to cause the diaphragm to move forwardly into sealed engagement with the outlet port.

6. In a shut-off valve for handling a fluid under pressure, a chamber, a movable diaphragm dividing the chamber into a front portion and a rear portion, two ports opening into the front portion of the chamber, one of said ports constituting an inlet for the fluid and the other constituting an outlet for the fluid, said diaphragm being movable forwardly to seat a predetermined area thereof against said ports and close off the outlet port and being movable rearwardly to place the outlet port in communication with the inlet port by way of the front portion of the chamber, a passage located downstream from the inlet port, between the inlet and outlet ports and outside of said predetermined diaphragm area for conducting some of the fluid under pressure from the inlet port into the rear portion of the chamber behind the diaphragm, a second relatively large passage for conducting such fluid from the rear portion to the outlet port, and a pilot valve for closing off said second passage, whereby the fluid entering the rear portion of the chamber through said first passage will be pocketed in the rear portion and will flood the same to cause the diaphragm to move forwardly into sealed engagement with the outlet port.

7. In a shut-off valve for handling a fluid under pressure, a chamber, a movable diaphragm dividing the chamber into a front portion and a rear portion, two ports opening into the front portion of the chamber, either of said ports constituting an inlet for the fluid and the other constituting an outlet for the fluid, said diaphragm being movable forwardly to seat a predetermined portion of the area thereof against said ports and close off the outlet port and being movable rearwardly to place the outlet port in communication with the inlet port by way of the front portion of the chamber, means located downstream from the inlet port, between the inlet and outlet ports and outside of said predetermined diaphragm area for conducting some of the fluid under pressure from the inlet port into the rear portion of the chamber behind the diaphragm, means for discharging such fluid from the rear portion, said last mentioned means permitting of a greater rate of flow than the first mentioned means, whereby to prevent any substantial accumulation of the fluid in the rear portion, and means for rendering said last mentioned means inoperative, whereby the fluid entering the rear portion of the chamber through said first mentioned means will be pocketed in the rear portion and will flood the same to cause the diaphragm to move forwardly into sealed engagement with the outlet port.

HAL W. McPHERSON.